(12) United States Patent
Wang et al.

(10) Patent No.: US 11,005,115 B2
(45) Date of Patent: May 11, 2021

(54) SUPPORTED NICKEL CATALYSTS USED AS DIRECT INTERNAL REFORMING CATALYST IN MOLTEN CARBONATE FUEL CELLS

(71) Applicant: FuelCell Energy, Inc., Danbury, CT (US)

(72) Inventors: Jin-Yun Wang, Cheshire, CT (US); Mohammad Farooque, Marlboro, NJ (US); Ramakrishnan Venkataraman, Danbury, CT (US); Chao-Yi Yuh, New Milford, CT (US); April Corpuz, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 31 days.

(21) Appl. No.: 16/092,723

(22) PCT Filed: Apr. 10, 2017

(86) PCT No.: PCT/US2017/026837
§ 371 (c)(1),
(2) Date: Oct. 10, 2018

(87) PCT Pub. No.: WO2017/180523
PCT Pub. Date: Oct. 19, 2017

(65) Prior Publication Data
US 2019/0131644 A1    May 2, 2019

Related U.S. Application Data

(60) Provisional application No. 62/321,043, filed on Apr. 11, 2016.

(51) Int. Cl.
*H01M 8/14*        (2006.01)
*B01J 23/755*    (2006.01)
(Continued)

(52) U.S. Cl.
CPC ........... *H01M 8/0637* (2013.01); *B01J 21/04* (2013.01); *B01J 21/066* (2013.01); *B01J 23/755* (2013.01);
(Continued)

(58) Field of Classification Search
None
See application file for complete search history.

(56) References Cited

U.S. PATENT DOCUMENTS 4,774,152 A    9/1988    Matsumura et al.
5,246,791 A    9/1993    Fisher et al.
(Continued)

FOREIGN PATENT DOCUMENTS

CA    2848981 A1    5/2013
CN    101830433 A    9/2010
(Continued)

OTHER PUBLICATIONS

International Search Report and Written Opinion in PCT/US2017/026837, dated Jun. 19, 2017 (7 pages).
(Continued)

*Primary Examiner* — Yoshitoshi Takeuchi
(74) *Attorney, Agent, or Firm* — Foley & Lardner LLP

(57) ABSTRACT

Disclosed here is a supported catalyst comprising a thermally stable core, wherein the thermally stable core comprises a metal oxide support and nickel disposed in the metal oxide support, wherein the metal oxide support comprises at least one base metal oxide and at least one transition metal oxide or rare earth metal oxide mixed with or dispersed in the base metal oxide. Optionally the supported catalyst can further comprise an electrolyte removing layer coating the thermally stable core and/or an electrolyte repelling layer coating the electrolyte removing layer, wherein the electrolyte removing layer comprises at least one metal oxide, and
(Continued)

wherein the electrolyte repelling layer comprises at least one of graphite, metal carbide and metal nitride. Also disclosed is a molten carbonate fuel cell comprising the supported catalyst as a direct internal reforming catalyst.

15 Claims, 2 Drawing Sheets

(51) Int. Cl.
| | | |
|---|---|---|
| B01J 23/83 | (2006.01) | |
| B01J 21/04 | (2006.01) | |
| B01J 21/06 | (2006.01) | |
| H01M 8/0637 | (2016.01) | |
| H01M 4/90 | (2006.01) | |
| B01J 35/00 | (2006.01) | |
| B01J 35/10 | (2006.01) | |

(52) U.S. Cl.
CPC ........... *B01J 23/83* (2013.01); *B01J 35/0086* (2013.01); *B01J 35/1009* (2013.01); *B01J 35/1014* (2013.01); *B01J 35/1019* (2013.01); *B01J 35/1061* (2013.01); *B01J 35/1066* (2013.01); *B01J 35/1071* (2013.01); *H01M 4/905* (2013.01); *H01M 4/9075* (2013.01); *H01M 8/145* (2013.01); *H01M 2008/147* (2013.01); *Y02E 60/50* (2013.01)

(56) References Cited

U.S. PATENT DOCUMENTS

| | | | |
|---|---|---|---|
| 7,902,111 B2 | 3/2011 | Roev et al. | |
| 8,575,063 B2 | 11/2013 | Xu | |
| 8,993,477 B2 | 3/2015 | Milanov et al. | |
| 2007/0111055 A1* | 5/2007 | Katikaneni | B01J 35/04 |
| | | | 429/423 |
| 2009/0068523 A1* | 3/2009 | Fukasawa | H01M 8/0202 |
| | | | 429/528 |
| 2010/0105546 A1 | 4/2010 | Xu et al. | |
| 2011/0003681 A1 | 1/2011 | Speyer et al. | |
| 2013/0023709 A1* | 1/2013 | Cizeron | B01J 23/002 |
| | | | 585/324 |
| 2013/0053237 A1 | 2/2013 | Xu et al. | |
| 2013/0216924 A1 | 8/2013 | Hillhouse | |
| 2014/0057781 A1* | 2/2014 | Stamm Masias | B01J 35/006 |
| | | | 502/263 |
| 2016/0006040 A1 | 1/2016 | Yoon et al. | |

FOREIGN PATENT DOCUMENTS

| | | |
|---|---|---|
| JP | 62-237667 A | 10/1987 |
| JP | 2015-504356 A | 2/2015 |
| KR | 1020140099472 A | 8/2014 |
| WO | WO-2011/087467 A1 | 6/2011 |

OTHER PUBLICATIONS

Wang et al, Direct internal reforming molten carbonate fuel cell with core-shell catalyst, International Journal of Hydrogen Energy; 2012, vol. 37, p. 2588-2595.
Notice of Preliminary Rejection on KR 10-2018-7032038 dated Apr. 27, 2020, with English translation (14 pages).
Second Office Action in JP2018-553207 dated Jun. 1, 2020, with English translation (12 pages).
Antolini, Ermete,The stability of molten carbonate fuel cell electrodes: A review of recent improvements,Applied Energy,2011,vol. 88,p. 4274-4293.
Choi, Jae-Suk et al., Development of nickel catalyst supported on MgO—TiO2 composite oxide for DIR-MCFC,Catalysis Today, 2004, vol. 93-95, p. 553-560.
Extended European Search Report in EP17782924.9 dated Apr. 17, 2019 (8 pages).
First Office Action in JP2018-553207 dated Sep. 27, 2019, with English translation (14 pages).

* cited by examiner

SUPPORTED NICKEL CATALYSTS USED AS DIRECT INTERNAL REFORMING CATALYST IN MOLTEN CARBONATE FUEL CELLS

CROSS-REFERENCE TO RELATED PATENT APPLICATION

This application is a U.S. national stage entry of International Application No. PCT/US2017/026837 filed on Apr. 10, 2017, and claims the benefit of and priority to U.S. Provisional Patent Application No. 62/321,043 filed on Apr. 11, 2016, the entire disclosures of which are incorporated by reference herein.

BACKGROUND

Conventional steam reforming catalysts can be divided into two major categories—pre-reforming catalysts and primary reforming catalysts. Pre-reforming catalysts are typically made through co-precipitation, which have high surface area and high nickel (Ni) loading with an operating temperature of <550° C. Primary reforming catalysts are typically made by supporting <25% Ni on a very low surface area support, with an operating temperature >750° C. Direct internal reforming catalysts are operated around 600-650° C. Pre-reforming catalysts are not stable under the operating conditions of direct internal reforming catalysts, while primary reforming catalysts do not have enough activity under fuel cell electrolyte-poisoning conditions. Hence, a need exists to develop a novel catalyst that is resistant to electrolyte poisoning and maintains stability for >7 years.

The conventional synthesis approach for catalyst used in molten carbonate fuel cells is co-precipitation, which produces uniform distribution of Ni and catalyst support. Both Ni and support are sintered during operation, resulting in a faster-than-desired drop in reforming rate, especially in off-normal transient operations, such as thermal cycles and shutdowns where the catalyst may undergo some oxidization. This may cause the catalyst activity to drop below acceptable limits early. Different approaches have been attempted previously to address this.

For example, U.S. Pat. No. 4,774,152 discloses a reforming catalyst for use with fuel cells free from degradation in a fuel gas containing an electrolyte. The reforming catalyst includes a catalytically active substance and an electrolyte-removing substance to remove electrolyte from the catalyst material. The electrolyte-removing substance has a porous structure and comprises a compound containing at least one of silicon, aluminum and chromium which chemically reacts with the electrolyte to remove it from the catalytically active material. The electrolyte-removing substance can be provided on the surface of a catalytically active substance. The electrolyte-removing substance may also be dispersed in the catalytically active substance. The catalytically active substance and the electrolyte-removing substance may also be molded in a mixed state. However, this approach did not address the sintering of the catalyst.

U.S. Pat. No. 5,246,791 discloses a reforming catalyst with improved resistance to deactivation by the electrolyte of a high temperature fuel cell comprising ruthenium on a support. While this may provide improved stability, it is not expected to achieve >7 year life in fuel cells. There was no discussion of concerns about sintering of the catalyst. Ruthenium can oxidize when exposed to oxygen during off normal conditions and may not retain its non-wetting properties. In addition, such catalyst would lead to much higher cost compared to Ni-based catalysts.

U.S. Pub. No. 2011/0003681 discloses that a catalyst with higher pore volume may avoid pore blockage by electrolyte. This approach, however, does not address the sintering of the catalyst and does not include features to prevent electrolyte from contacting the catalyst, and as a result is not expected to have the ability to provide >7 year life in fuel cells.

U.S. Pat. No. 8,575,063 discloses a Ni-based catalyst with various mixed metal oxide supports having a large mesopore pore volume and specific ratio of mesopore volume to total pore volume. However, this does not prevent electrolyte from getting to the catalyst. Catalysts made this way have high surface area and will age faster under fuel cell conditions.

U.S. Pat. No. 8,993,477 discloses a Ni-based catalyst made with oxides of nickel, aluminum, and zirconia, with another oxygen containing aluminum compound selected from a group of aluminum hydroxide, aluminum oxyhydroxide, and aluminum oxide. This approach, however, may not adequately reduce sintering and improve thermal stability.

Zhang et al., Int'l J. Hydrogen Energy, 37(3): 2588-2595 (2012) discloses a core-shell catalyst system with a colloidal silica-based coating on a $Ni/Al_2O_3$ catalyst. Zhang et al. claimed that the silica used on the shell prevents electrolyte from attacking the catalyst due to fine pores. This approach again does not address thermal sintering of the catalyst. While the barrier may reduce electrolyte diffusion in short term, it may allow electrolyte to pass through as a liquid due to its wetting properties. Also silica is not stable in a carbonate electrolyte environment with high temperature and high moisture.

U.S. Pub. No. 2016/0006040 discloses a catalyst with doped Perovskite type oxide that has low wettability for electrolyte, which allegedly reduced sintering. Metal oxides typically have low contact angle with the carbonate electrolyte. They may develop high wettability under off normal conditions with oxygen exposure.

SUMMARY

To overcome the aforementioned design constraints and challenges, a new type of direct internal reforming catalyst is disclosed herein. This direct internal reforming catalyst comprises an active component—Ni supported on a mixture of stable metal oxides—that has unique characteristics of low to medium surface area, high thermal stability, and/or the ability to prevent electrolyte from contacting the catalyst and thus avoid poisoning of the catalyst by an electrolyte, resulting in improved structural integrity and stabilized catalytic activity of the direct internal reforming catalyst.

According to one embodiment, the direct internal reforming catalyst includes Ni deposited on a pre-stabilized support with low to medium surface area containing transition and/or rare earth metals to provide both thermal stability and favorable catalyst support interaction. The catalyst has medium Ni content, which ensures sintering is significantly reduced. Additionally, the catalyst described here can be coated with one or more layers. The purpose of the coatings can be either to repel electrolyte from getting on the catalyst tablets or to remove the electrolyte that enters the catalyst through vapor deposition or by creep of liquid electrolyte. In this regard, non-polar materials (e.g., graphite, carbides, and nitrides) can be used to repel electrolyte, while high surface area metal oxide materials can be used to remove electrolyte.

The catalyst described here can be substantially or totally free of silicate in the support and/or the coating layers.

Accordingly, according to one exemplary embodiment, a supported catalyst includes a thermally stable core, where the thermally stable core includes a metal oxide support and nickel disposed in the metal oxide support. The metal oxide support includes at least one base metal oxide or ceramic material, and at least one transition metal oxide or rare earth metal oxide mixed with or dispersed in the base metal oxide or ceramic material.

In some embodiments, the metal oxide support has a surface area within a range of 5 to 120 $m^2/g$. In some embodiments, the base metal oxide or ceramic material includes at least one alkaline metal oxide or post-transition metal oxide. In some embodiments, the base metal oxide or ceramic material includes at least one of alumina, CaO, and/or MgO. In some embodiments, the metal oxide support has at least two different transition metal oxides and/or rare earth metal oxides in addition to the base metal oxide or ceramic material. In some embodiments, an amount of the transition metal oxide and the rare earth metal oxide is within a range of 1 to 20 wt. % of the supported catalyst. In some embodiments, an amount of the nickel is within a range of 10 to 50 wt. % of the supported catalyst. In some embodiments, the supported catalyst has a mean pore diameter within a range of 65 to 700 Å, as measured by mercury porosimetry of pelletized catalyst, and a pore size distribution characterized by a standard deviation of less than 10% of the mean pore diameter.

According to another exemplary embodiment, a supported catalyst also includes an electrolyte removing component, the electrolyte removing component including at least one metal oxide. In some embodiments, the electrolyte removing component is an electrolyte removing layer coating a thermally stable core to form a core-shell structure. In some embodiments, the electrolyte removing component is mixed with or dispersed in the thermally stable core. In some embodiments, the electrolyte removing component includes aluminum oxide, titanium oxide, zirconium oxide, tungsten oxide, a doped oxide thereof, or a mixture thereof. In some embodiments, the electrolyte removing component has a surface area of at least about 50 $m^2/g$.

According to another exemplary embodiment, a supported catalyst also includes an electrolyte repelling component, the electrolyte repelling component including at least one of graphite, metal carbide, and/or metal nitride. In some embodiments, the electrolyte repelling component is an electrolyte repelling layer coating a thermally stable core to form a core-shell structure. In some embodiments, the electrolyte repelling component is mixed with or dispersed in the thermally stable core.

According to another exemplary embodiment, a supported catalyst also includes an electrolyte removing layer coating a thermally stable core and an electrolyte repelling layer coating the electrolyte removing layer, wherein the electrolyte removing layer has at least one metal oxide, and the electrolyte repelling layer has at least one graphite, metal carbide, and/or metal nitride. In some embodiments, the supported catalyst is free of silicate since silicate will gradually be vaporized under the direct internal reforming conditions with high temperature and high steam. According to another exemplary embodiment, a molten carbonate fuel cell includes the supported catalyst described herein as a direct internal reforming catalyst. In some embodiments, the direct internal reforming catalyst retains at least about 60% of its initial catalytic activity after 500 hours of operation.

The supported catalyst described herein have many technical advantages. In some embodiments, the catalyst may inhibit further sintering of the metal oxide support because it is already sintered and thermally stable. Sintering of Ni may occur but is also reduced because of good Ni dispersion due to the stable support and lower Ni loading. Pre-sintering may occur during catalyst formation or after catalyst formation, but prior to inclusion into a product (e.g., a fuel cell module). In some embodiments, the transition metal(s) and/or rare earth metal(s) may promote reforming reactions to improve activity and stability of the catalyst.

These and other features, together with the organization and manner of operation thereof, will become apparent from the following detailed description when taken in conjunction with the accompanying drawings.

DETAILED DESCRIPTION

Reference will now be made in detail to some specific embodiments contemplated by the inventors. While various inventions are described in conjunction with these specific embodiments, it will be understood that it is not intended to limit the invention(s) to the described embodiments. On the contrary, it is intended to cover alternatives, modifications, and equivalents as may be included within the spirit and scope of the inventions as defined by the appended claims.

In the following description, numerous specific details are set forth in order to provide a thorough understanding of the present inventions. Particular example embodiments of the present inventions may be implemented without some or all of these specific details. In other instances, well known process operations have not been described in detail in order not to unnecessarily obscure the present inventions.

Various techniques and mechanisms of the present inventions will sometimes be described in singular form for clarity. However, it should be noted that some embodiments include multiple iterations of a technique or multiple instantiations of a mechanism unless noted otherwise.

Supported Catalyst

Figure 1:
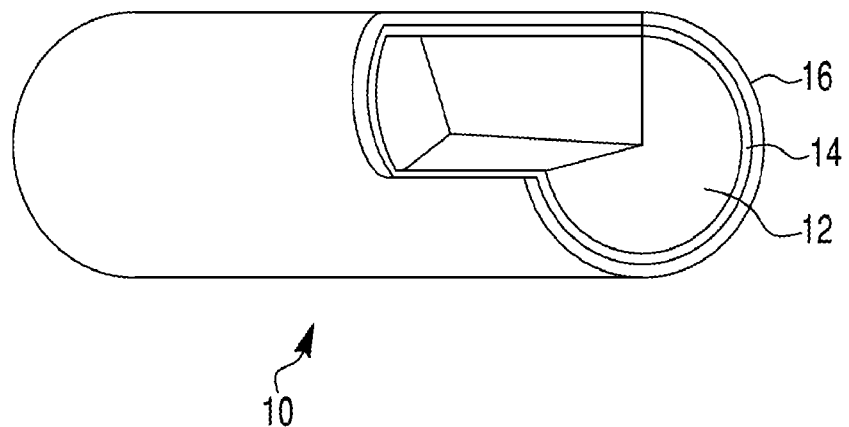
FIG. 1 is a cutaway illustration of an example embodiment of the supported catalyst.

According to various exemplary embodiments, a supported catalyst (10) includes a thermally stable core (12), as shown in FIG. 1, where the thermally stable core (12) includes a metal oxide support and nickel disposed in the metal oxide support. The metal oxide support includes at least one base metal oxide or ceramic material, and at least one transition metal oxide or rare earth metal oxide is mixed with or dispersed in the base metal oxide or ceramic material.

In some embodiments, the metal oxide support has a low to medium surface area to improve durability of the catalyst. In some embodiments, the metal oxide support has a surface area of about 5-120 $m^2/g$, or about 5-20 $m^2/g$, or about 20-50 $m^2/g$, or about 50-120 $m^2/g$.

In some embodiments, the metal oxide support comprises a mixture of at least two different metal oxides. In some embodiments, the metal oxide support comprises a mixture of at least three different metal oxides.

In some embodiments, the base metal oxide comprises alkaline earth metal oxide(s). In some embodiments, the base metal oxide comprises transition metal oxide(s). In some embodiments, the base metal oxide comprises post transition metal oxide(s). In some embodiments, the base metal oxide comprises rare earth metal oxide(s). In some embodiments, the base metal oxide comprises at least one of alumina, CaO, and MgO.

The presence of the transition metal oxide(s) and/or rare earth metal oxide(s), in addition to the base catalyst, can stabilize the metal oxide support and also promote catalyst support interactions. In some embodiments, the thermally stable core comprises at least one transition metal oxide (e.g., ZrOx, TiOx) in addition to the base catalyst. In some embodiments, the thermally stable core comprises at least one rare earth metal oxide (e.g., LaOx) in addition to the base catalyst.

In some embodiments, the metal oxide support comprises at least two different transition metal oxides and/or rare earth metal oxides. In some embodiments, the metal oxide support comprises at least three different transition metal oxides and/or rare earth metal oxides.

In some embodiments, the transition metal oxide(s) and rare earth metal oxide(s) account for about 1-20 wt. %, or about 1-5 wt. %, or about 5-10 wt. %, or about 10-20 wt. % of the supported catalyst. In some embodiments, the transition metal oxide(s) and rare earth metal oxide(s) account for about 1-20 wt. %, or about 1-5 wt. %, or about 5-10 wt. %, or about 10-20 wt. % of the thermally stable core.

In some embodiments, the supported catalyst has a medium to high Ni loading to provide adequate reforming rate under fuel cell operational conditions. In some embodiments, the nickel accounts for about 10-50 wt. %, or about 10-20 wt. %, or about 20-30 wt. %, or about 30-50 wt. % of the supported catalyst. In some embodiments, the nickel accounts for about 10-50 wt. %, or about 10-20 wt. %, or about 20-30 wt. %, or about 30-50 wt. % of the thermally stable core.

In some embodiments, the nickel is deposited in the metal oxide support through co-precipitation of the nickel and the metal oxide. In some embodiments, the nickel is deposited in a stable (pre-sintered) metal oxide support which may also include transition metal oxide(s) and/or rare earth metal oxide(s).

In some embodiments, the supported catalyst or the thermally stable core has a low mean pore diameter and a narrow pore size distribution.

In some embodiments, the supported catalyst has a mean pore diameter of about 65-700 Å, or about 65-200 Å, or about 200-300 Å, or about 300-400 Å, or about 400-500 Å, or about 500-600 Å, or about 600-700 Å, as measured by mercury porosimetry of pelletized catalyst. In some embodiments, the thermally stable core has a mean pore diameter of about 65-700 Å, or about 65-200 Å, or about 200-300 Å, or about 300-400 Å, or about 400-500 Å, or about 500-600 Å, or about 600-700 Å, as measured by mercury porosimetry of pelletized catalyst.

In some embodiments, the supported catalyst has a pore size distribution characterized by a standard deviation of less than about 50%, or less than about 20%, or less than about 10% of the mean pore diameter. In some embodiments, the thermally stable core has a pore size distribution characterized by a standard deviation of less than about 50%, or less than about 20%, or less than about 10% of the mean pore diameter.

In some embodiments, the supported catalyst is substantially or totally free of silicate. In some embodiments, the thermally stable core is substantially or totally free of silicate.

According to various exemplary embodiments, a supported catalyst (10) further comprises an electrolyte removing component (14) and/or an electrolyte repelling component (16), as shown in FIG. 1.

In some embodiments, the supported catalyst further comprises an electrolyte removing component to remove electrolyte that is in contact with the catalyst, wherein the electrolyte removing component comprises at least one metal oxide.

In some embodiments, the electrolyte removing component is in the form of an electrolyte removing layer coating the thermally stable core to form a core-shell structure. In some embodiments, the electrolyte removing component is mixed with or dispersed in the thermally stable core.

In some embodiments, the electrolyte removing component has a surface area of at least about 50 $m^2/g$, or at least about 70 $m^2/g$, or at least about 100 $m^2/g$.

In some embodiments, the electrolyte removing component comprises a single metal oxide. In some embodiments, the electrolyte removing component comprises a mixture of at least two different metal oxides. In some embodiments, the electrolyte removing component comprises a mixture of at least three different metal oxides. In some embodiments, the electrolyte removing component comprises doped metal oxide(s).

In some embodiments, the electrolyte removing component comprises alkaline earth metal oxide(s). In some embodiments, the electrolyte removing component comprises transition metal oxide(s). In some embodiments, the electrolyte removing component comprises post transition metal oxide(s). In some embodiments, the electrolyte removing component comprises rare earth metal oxide(s).

In some embodiments, the electrolyte removing component comprises aluminum oxide, titanium oxide, zirconium oxide, tungsten oxide, a doped oxide thereof, or a mixture thereof.

In some embodiments, the supported catalyst further comprises an electrolyte repelling component to prevent electrolyte from contacting the catalyst, wherein the electrolyte repelling component comprises at least one of graphite, carbide and nitride.

In some embodiments, the electrolyte repelling component is in the form of an electrolyte repelling layer coating the thermally stable core to form a core shell structure. In some embodiments, the electrolyte repelling component is mixed with or dispersed in the thermally stable core.

In some embodiments, the electrolyte repelling component comprises a single material. In some embodiments, the electrolyte repelling component comprises a mixture of at least two different materials. In some embodiments, the electrolyte repelling component comprises a mixture of at least three different materials. In some embodiments, the electrolyte repelling component comprises graphite.

In some embodiments, the electrolyte repelling component comprises one or more metal carbide(s). In some embodiments, the electrolyte repelling component comprises transition metal carbide(s). In some embodiments, the electrolyte repelling component comprises post transition metal carbide(s). In some embodiments, the electrolyte repelling component comprises rare earth metal carbide(s).

In some embodiments, the electrolyte repelling component comprises one or more metal nitride(s). In some embodiments, the electrolyte repelling component comprises transition metal nitride(s). In some embodiments, the electrolyte repelling component comprises post transition metal nitride(s). In some embodiments, the electrolyte repelling component comprises rear earth metal nitride(s).

In some embodiments, the supported catalyst further comprises an electrolyte removing layer coating the thermally stable core and an electrolyte repelling layer coating the electrolyte removing layer, wherein the electrolyte removing layer comprises at least one metal oxide, and wherein the electrolyte repelling layer comprises at least one of graphite, carbide, or nitride.

In some embodiments, the supported catalyst is not coated by a silicate-containing layer.

Furthermore, many embodiments of the invention relate to a molten carbonate fuel cell comprising the supported catalyst described herein as a direct internal reforming catalyst.

In some embodiments, the direct internal reforming catalyst in the molten carbonate fuel cell retains at least about 50%, or at least about 60%, or at least about 70% of its initial catalytic activity after 200 hours of accelerated testing (e.g., to simulate aging in a fuel cell stack). In some embodiments, the direct internal reforming catalyst in the molten carbonate fuel cell retains at least about 50%, or at least about 60%, or at least about 70% of its initial catalytic activity after 500 hours of accelerated testing. In some embodiments, the direct internal reforming catalyst in the molten carbonate fuel cell retains at least about 50%, or at least about 60%, or at least about 70% of its initial catalytic activity after 700 hours of accelerated testing.

Synthesis of Supported Catalyst

Catalyst aging can be caused by sintering of Ni catalyst, coverage of the catalyst by electrolyte, sintering of support creating large internal pores which causes electrolyte to penetrate deep inside, and blockage of pores by electrolyte deposited on the pores. Known production methods do not address these deactivation mechanisms and therefore cannot provide a stable catalyst to achieve a fuel cell life of 7-10 years. For example, the most common approach involves co-precipitation of Ni and the support for ease of manufacturing and provides uniform distribution of Ni and support. The disadvantage of this approach is sintering of both support and Ni during service, which causes collapse of structure, blockage of pores and access to Ni, which then leads to loss of activity.

The supported catalyst described here can be synthesized in at least two different ways. One is to coat electrolyte removing or repelling materials onto catalyst made through co-precipitation after heat treatment. The second way is to deposit Ni onto stable (pre-sintered) support which may also include transition and/or rare earth metals. This catalyst core can then be coated with electrolyte removing or repelling materials.

Applications

The supported catalyst described herein can be used in a carbonate electrolyte environment that requires hydrocarbon reforming, in particular as a direct internal reforming catalyst in a molten carbonate fuel cell. It can also be used in other high temperature steam reforming applications, such as industrial hydrogen production in the fertilizer industry, the food processing industry, and the metallurgical industry.

Working Example

A supported catalyst was synthesized using a low surface area alumina support (~11 $m^2/g$) with a transition metal oxide (ZrOx, ~6 wt. %) and a rare earth metal oxide (LaOx, ~4 wt. %). A low amount of Nickel (~25%) was deposited on this material. The supported catalyst was extruded to provide a mean pore diameter of ~300 Å, with a relatively large pore size distribution (standard deviation of ~40% of mean pore diameter).

A current state-of-the-art catalyst, which has a high Ni surface area and a catalyst support that is susceptible to aging during fuel cell operation, was used as the baseline catalyst for comparison.

Figure 2:
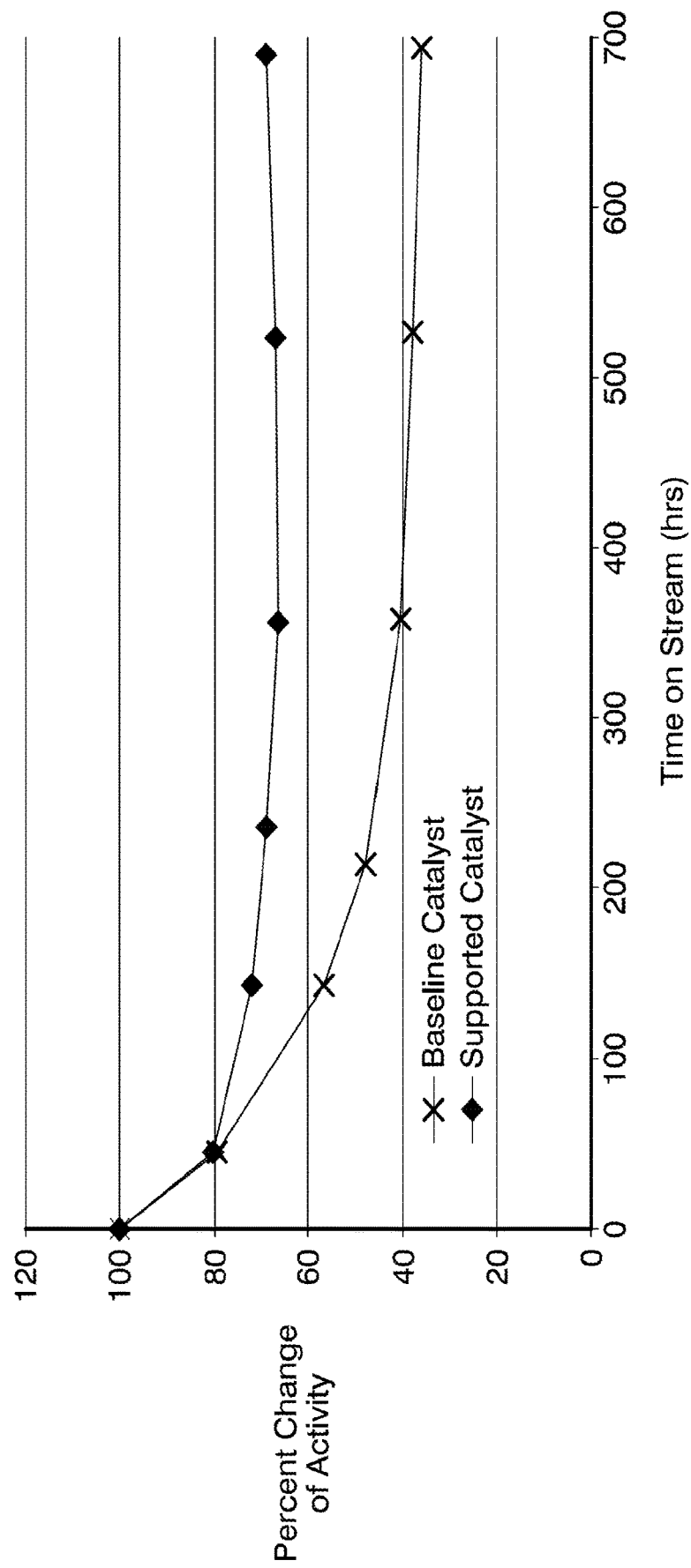
FIG. 2 shows activity change of an example embodiment of the supported catalyst compared with a baseline catalyst.

As shown in FIG. 2, the supported catalyst exhibited improve stability throughout the test period (~700 hours) compared to the baseline catalyst, and retained more than 60% of its initial catalytic activity after ~700 hours of accelerated testing.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the inventions. The inventions illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A supported catalyst comprising:
   a thermally stable core, comprising a metal oxide support and nickel disposed in the metal oxide support, wherein the metal oxide support comprises at least one base metal oxide and at least one transition metal oxide or rare earth metal oxide mixed with or dispersed in the base metal oxide; and at least one electrolyte repelling layer coating the thermally stable core to form a core-shell structure, wherein the electrolyte repelling layer comprises at least one of graphite, metal carbide, and/or metal nitride.

2. The supported catalyst of claim 1, wherein the metal oxide support has a surface area within a range of 5 to 120 $m^2/g$.

3. The supported catalyst of claim 1, wherein the base metal oxide comprises at least one alkaline metal oxide or post-transition metal oxide.

4. The supported catalyst of claim 1, wherein the base metal oxide comprises at least one of alumina, CaO, and/or MgO.

5. The supported catalyst of claim 1, wherein the metal oxide support comprises at least two different transition metal oxides and/or rare earth metal oxides in addition to the base metal oxide.

6. The supported catalyst of claim 1, wherein an amount of the transition metal oxide and the rare earth metal oxide is within a range of 1 to 20 wt. % of the supported catalyst.

7. The supported catalyst of claim 1, wherein an amount of the nickel is within a range of 10 to 50 wt. % of the supported catalyst.

8. The supported catalyst of claim 1, wherein the supported catalyst has a mean pore diameter within a range of 65 to 700 Å, as measured by mercury porosimetry of pelletized catalyst, and has a pore size distribution characterized by a standard deviation of less than 10% of the mean pore diameter.

9. The supported catalyst of claim 1, further comprising an electrolyte removing layer.

10. The supported catalyst of claim 9, wherein the electrolyte removing layer comprises at least one metal oxide.

11. The supported catalyst of claim 10, wherein the electrolyte removing layer comprises aluminum oxide, titanium oxide, zirconium oxide, tungsten oxide, a doped oxide thereof, or a mixture thereof.

12. The supported catalyst of claim 10, wherein the electrolyte removing layer has a surface area of at least about 50 $m^2/g$.

13. The supported catalyst of claim 1, wherein the supported catalyst is free of silicate.

14. A molten carbonate fuel cell comprising the supported catalyst of claim 1 as a direct internal reforming catalyst.

15. The molten carbonate fuel cell of claim 14, wherein the direct internal reforming catalyst retains at least about 60% of its initial catalytic activity after 500 hours of operation.

* * * * *